April 1, 1952 J. T. LEVELL 2,591,562
VEHICLE RADIATOR CAP
Filed May 18, 1950
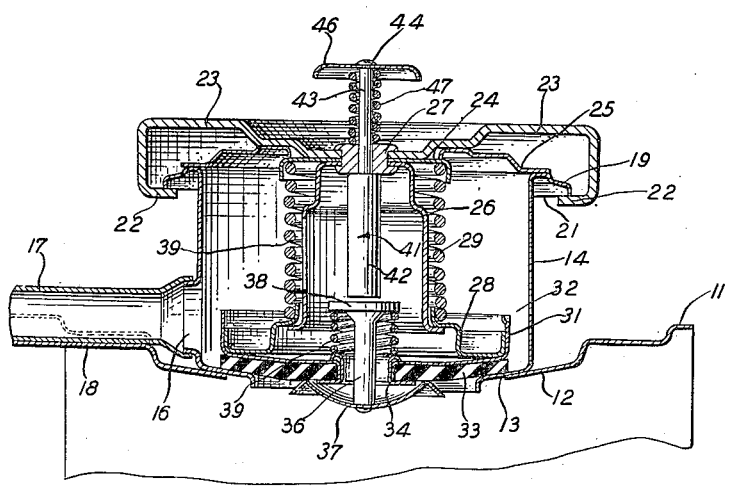
J. T. LEVELL
INVENTOR.
BY E. C. McRae
J. P. Faulkner
F. H. Oster
ATTORNEYS Patented Apr. 1, 1952

2,591,562

UNITED STATES PATENT OFFICE 2,591,562

VEHICLE RADIATOR CAP

James T. Levell, Detroit, Mich., assignor to Ford Motor Company, Dearborn, Mich., a corporation of Delaware Application May 18, 1950, Serial No. 162,716

1 Claim. (Cl. 220—44)

This invention relates generally to a pressure cap for a motor vehicle radiator.

It is common practice in present automotive design to pressurize cooling systems for greater efficiency. This is accomplished by providing a pressure cap closing the filler neck at the upper end of the radiator and equipped with a spring loaded valve arranged to open at a predetermined pressure to establish communication between the radiator and the overflow tube. With the constantly increasing pressures under which such closed cooling systems operate it has become increasingly difficult and hazardous to remove the radiator cap. To avoid the sudden release of pressure from the filler neck when the radiator cap is removed, the present invention provides manually operable means for reducing the pressure in the radiator by by-passing it through the overflow tube prior to removing the cap. By providing the manually operable means in a visible and readily accessible location, such as protruding from the top of the radiator cap, the possibility of the cap being inadvertently removed without first releasing the pressure is greatly reduced.

Other objects and advantages of this invention will be made more apparent as this description proceeds, particularly when considered in connection with the accompanying drawing, wherein:

The figure is a fragmentary enlarged cross sectional view of the upper portion of a motor vehicle radiator having a filler neck closed by a pressure cap incorporating the present invention.

Referring now to the drawing, the reference character 11 indicates the upper wall of a motor vehicle radiator, the wall having a depressed portion at 12 forming a ledge upon which the lower inturned flange 13 of the cylindrical filler neck 14 is seated. The joint between the upper radiator wall and the filler neck is preferably sealed by soldering. An opening 16 is formed in one wall of the filler neck and communicates with the open end of an overflow tube 17, the joint between the filler neck and the tube being sealed by solder. The upper wall 11 of the radiator is depressed at 18 to provide a channel within which the overflow tube is seated.

The upper end of the filler neck 14 is formed with an outwardly and downwardly extending flange 19, the lower edge 21 of which is formed with cam surfaces cooperating with the inturned lugs 22 provided on the cap 23 in the conventional manner. The cap 23, upper spring retainer 24, and sleeve 26 are formed with aligned central apertures and are clamped together by means of a hollow rivet 27.

An annular diaphragm 25 formed of relatively thin spring brass is seated between the cap 23 and the upper spring retainer 24 and is arranged to resiliently engage the upper flange 19 of the filler neck 14 when the cap is placed on the filler neck, thus cooperating with the inturned lugs 22 on the cap to hold the cap tightly in place during vehicle operation. The cap may of course be removed by rotating the cap until the lugs 22 are aligned with conventional slots (not shown) provided in the flange 19 of the filler neck.

The lower end of the sleeve 26 is formed with an outturned flange providing a stop for the annular lower spring retainer 28. The retainer 28 is slidably mounted upon the sleeve, being normally held in its lowermost position by means of the coil spring 29 extending between the upper and lower spring retainers. A cup-shaped lower plate 31 is secured to the lower spring retainer 28 by crimping the outer edge at several places 32 located around the periphery of the plate. A rubber gasket 33 is clamped to the lower side of the bottom plate 31 by means of a hollow grommet 34. The stem 36 of a vacuum valve 37 extends through the hollow grommet 34 and is formed with a head 38 at its upper end. A coil spring 39 extends between the head of the vacuum valve and the grommet 34 and normally urges the valve upwardly into seating engagement with the rubber gasket 33, thus closing the opening formed between the shank 36 of the valve and the side walls of the hollow grommet 34.

As seen in the drawing, the rubber gasket 33 carried by the bottom plate 31 is urged by the coil spring 29 into seating engagement with the inturned flange 13 provided at the lower end of the filler neck 14. Communication between the radiator and the filler neck is thus closed until the pressure within the radiator becomes sufficient to raise the pressure relief valve formed by the rubber gasket 33 and the bottom plate 31 against the action of the coil spring 29. Communication is then established between the radiator and the overflow tube 17. By properly designing the parts of the cap the pressure within the radiator can be maintained at any desired level.

Pressure caps for motor vehicle radiators conventionally include a vacuum valve such as 37 arranged to open and to permit air to enter the radiator when the pressure in the radiator is below atmospheric. Elongated vertical slots 39 formed in the side walls of the sleeve 26 are provided to insure communication between the radiator and the overflow tube when the vacuum valve is open.

A push rod 41 is assembled axially within the pressure cap. The push rod has a lower cylindrical section 42 of greater diameter than the diameter of the opening in the hollow rivet 27, and an upper cylindrical portion 43 of reduced diameter extending through the hollow rivet. The upper end 44 of the push rod is riveted over a push button 46. A coil spring 47 surrounds the upper portion 43 of the push rod and extends between the push button 46 and the hollow rivet 27, normally urging the push rod 41 upwardly until the shoulder between the upper and lower portions 42 and 43 is seated against the lower surface of the rivet 27. In this position the bottom of the push rod 41 is spaced a short distance above the head 38 of the shank 36 of the vacuum valve 37.

When it is desired to remove the pressure cap from the pressurized radiator, the push button 46 is manually depressed against the resistance of spring 47, moving the push rod 41 into engagement with the head 38 of the shank of the vacuum valve 37 and moving the latter downwardly out of engagement with the rubber gasket 33. Communication is thus established between the interior of the radiator and the overflow tube 17 through the hollow grommet 34 and the slots 39 formed in the wall of the sleeve 26. The button is held depressed for a short interval, long enough to permit the pressure within the radiator to drop to atmospheric pressure, after which the radiator cap can be readily removed in the usual manner by rotating the cap. Inasmuch as the cooling system is no longer pressurized, removal of the cap is greatly facilitated and the possibility of having steam and hot water gush from the upper end of the filler neck when the cap is removed is eliminated.

It will be understood that the invention is not to be limited to the exact construction shown and described, but that various changes and modifications may be made without departing from the spirit and scope of the invention, as defined in the appended claim.

What is claimed is:

A pressure cap for a motor vehicle radiator having a filler neck extending upwardly from the top of the radiator, a seat within the filler neck, and an overflow tube communicating with the interior of the filler neck above the seat, comprising a cap having inturned lugs at opposite sides thereof cooperating with the upper end of the filler neck to clamp the cap thereon, a spring retainer beneath said cap, an inverted cup-shaped supporting member beneath said spring retainer, said cap, spring retainer and supporting member having aligned apertures therethrough, a hollow grommet extending through said apertures and clamping said cap, spring retainer and supporting member together, a lower spring retainer slideably mounted upon said supporting member, a bottom plate carried by said lower spring retainer, a resilient gasket beneath said bottom plate, said bottom plate and said gasket having aligned apertures therethrough, a hollow grommet extending through said last-mentioned apertures and securing said bottom plate and gasket together, a coil spring surrounding said supporting member and extending between said upper and lower spring retainers and urging said gasket into engagement with the seat in said filler neck, a valve beneath said gasket for closing the aperture through said gasket and bottom plate, said valve having a shank extending upwardly through said last-mentioned apertures and having an enlarged head at the upper end thereof, a coil spring between said head and said bottom plate normally urging said valve upwardly into engagement with said gasket, a push rod positioned within said supporting member and having a portion of reduced diameter extending upwardly through said hollow grommet and a substantial distance above the upper surface of said head, a push button secured to the upper end of said push rod, a coil spring surrounding the reduced portion of said push rod and extending between said push button and said cap and normally urging said push rod upwardly until the shoulder between the upper and lower portions of said push rod seats against said first-mentioned grommet and the lower end of the push rod is spaced a short distance above the head of the valve, said push rod being effective upon depression by manual operation of the push button to depress said valve and establish communication between the radiator and the overflow tube to relieve the pressure in the radiator.

JAMES T. LEVELL.

REFERENCES CITED

The following references are of record in the file of this patent:

UNITED STATES PATENTS

| Number | Name | Date |
|---|---|---|
| 1,326,124 | Vicher | Dec. 23, 1919 |
| 1,666,935 | Howell | Apr. 24, 1928 |